United States Patent [19]

Janusch

[11] Patent Number: 4,541,929
[45] Date of Patent: Sep. 17, 1985

[54] DEVICE FOR DRYING OF SOLID MATERIALS

[75] Inventor: Alois Janusch, Leoben, Austria

[73] Assignee: Voest-Alpine Aktiengesellschaft, Vienna, Austria

[21] Appl. No.: 457,623

[22] Filed: Jan. 13, 1983

[30] Foreign Application Priority Data

Jan. 20, 1982 [AT] Austria ............................ 191/82

[51] Int. Cl.⁴ ............................................ B01D 33/06
[52] U.S. Cl. ...................................... 210/217; 210/365; 210/374; 210/398; 210/512.3
[58] Field of Search .............. 210/109, 110, 111, 113, 210/360.1, 360.2, 367, 369, 374, 375, 378, 380.3, 383, 177, 178, 186, 216, 217, 371, 398, 402, 512.1, 512.3; 34/58

[56] References Cited

U.S. PATENT DOCUMENTS

| 741,999 | 10/1903 | Boulanger | 210/369 |
|---|---|---|---|
| 2,100,117 | 11/1937 | Wettlaufer | 210/369 |
| 3,292,350 | 12/1966 | Tasset | 34/58 |
| 3,385,443 | 5/1968 | Cuza | 210/178 |
| 3,489,283 | 1/1970 | McKay | 210/178 |
| 4,071,440 | 1/1978 | Jedo et al. | 209/44 |
| 4,292,051 | 9/1981 | Kime | 210/374 |
| 4,330,946 | 5/1982 | Courneya | 34/1 |

Primary Examiner—Richard V. Fisher
Assistant Examiner—Wanda L. Millard
Attorney, Agent, or Firm—Cushman, Darby & Cushman

[57] ABSTRACT

A sieve drum (2) for drying solid materials such as, for example, brown coal is rotatably supported for being rotated around its axis (8). A conveying screw (3) is arranged within the interior of the sieve drum and can be rotated independent from the rotation of the sieve drum (2). The sieve drum (2) is designed as a slot-sieve drum, the slots (26) of which extend within the mantle of the drum from one front end (7) of the drum to its other front end (5). The sieve drum (2) and the conveying screw (3) are arranged within a tightly closable pressure resistant housing (1), steam supply openings (22) being connected to the housing (1) outside of the sieve drum.

7 Claims, 2 Drawing Figures

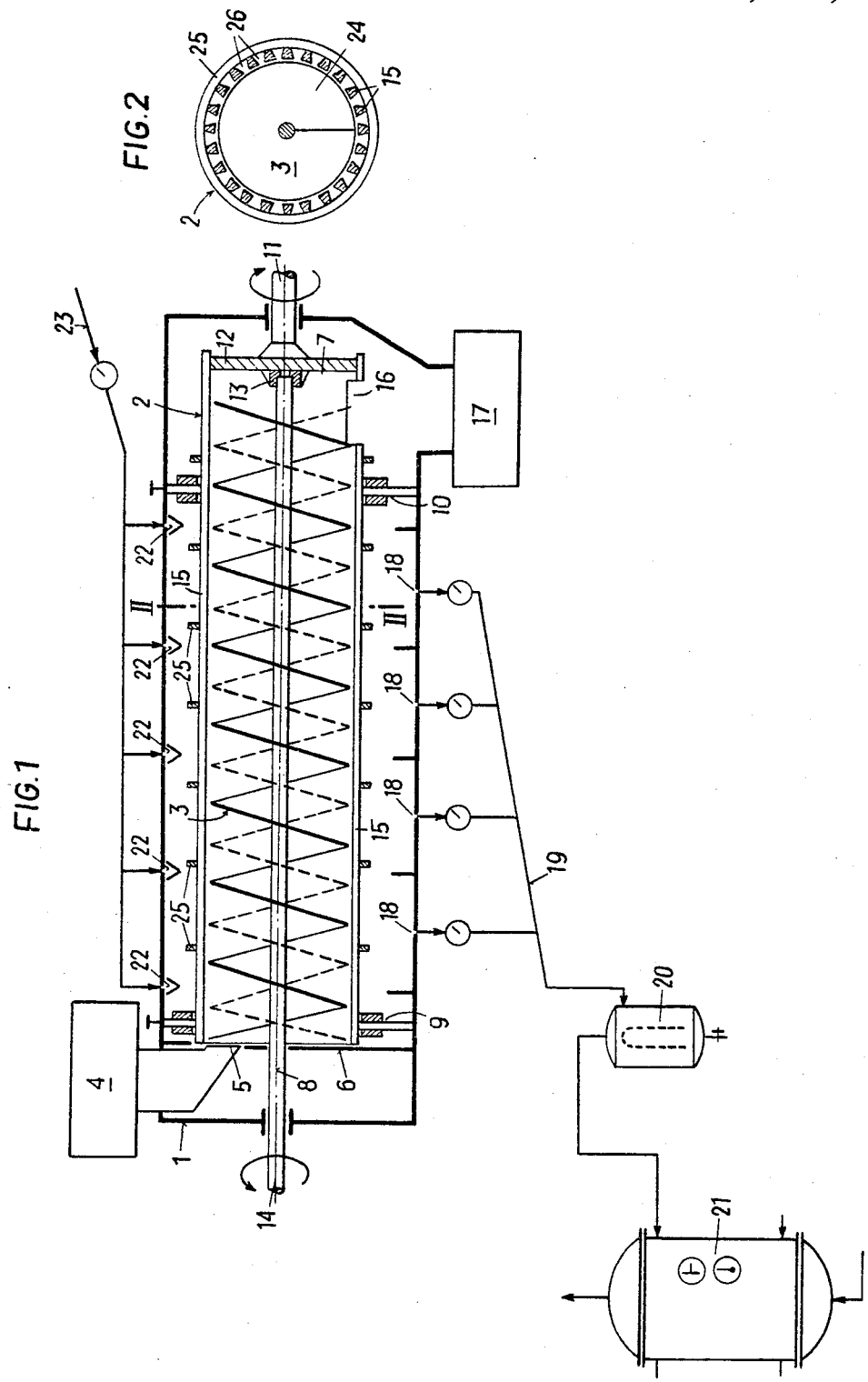

DEVICE FOR DRYING OF SOLID MATERIALS

The invention refers to a device for dewatering and drying solid materials such as, for example, brown coals containing water, sewage sludges, pulp liquids or the like by means of a rotatably supported sieve drum. Furthermore, the device according to the invention can be used for leaching organic materials as well as inorganic materials at ambient pressure or at a higher pressure by means of a leaching medium of corresponding temperature. It is already known to separate the solid material from the liquid proportion of a suspension or a sludge by means of slotted sieves. Such slotted sieves are, as a rule, obliquely arranged and having their slots delimited by rods of the sieve extending in horizontal direction. In this case, the suspension or sludge supplied flows in downward direction on the inclined sieve surface. The liquid proportion flows through the slots while the solid proportion is sliding downwardly. The surface of the sieve rods is downwardly inclined relative to a horizontal plane and the sieve rods can, for improving the sieve action, be arranged in a stepped manner, so that the suspension or sludge supplied falls, for the step, downwardly from one sieve rod to the next one. The dewatering effect is the greater is the length of the slotted sieve in flowing direction of the suspension or sludge, however, the length of known slotted sieves is most frequently limited by existing space requirements.

It is an object of the invention to improve dewatering of water-containing solid materials by means of a device which can, without ample modification, be arranged within an autoclave and thus be operated under steam pressure. Such operation under steam pressure is in particular required for dewatering water-containing brown coals. For solving this task, the invention essentially consists in that the sieve drum is designed as a slot-sieve drum having its slots extending within the drum mantle from one end to the other end, in that within the interior of the drum a conveying screw is coaxially arranged relative to the drum and in that the conveying screw and the drum are arranged for being rotated around their axes one with the other or separately one from the other. By using a slot-sieve drum, the dewatering capacity can substantially be increased over usual sieve drums and a substantially more compact construction can advantageously be obtained as compared with the use of usual slotted sieves. For reliably maintaining a flow of the material to be dewatered, which according to a preferred embodiment is supplied as a suspension, from one end of the slot-sieve drum to its other end, a conveying screw is, according to the invention, arranged within the interior of the drum for conveying the material to be dewatered along the inner mantle of the sieve drum in axial direction of the sieve drum. The conveying screw can, in this case, be rotated independently from the sieve drum and can have its screw threads at a distance from the inner mantle of the sieve drum and an embodiment can, in this manner, be established in which no centrifugal force is effected by the sieve drum in spite of a high throughput per unit of time and of a correspondingly high rotating speed of the conveying screw. When operating with low throughput, the conveying screw and the drum can be rotated with the same speed and in this case the stability of the slot-sieve drum can be increased by means of a rigid connection between the screw thread of the conveying screw and the mantle of the slot-sieve drum. The suspension or sludge is thus flowing from one end of the sieve drum to its other end in view of the rotation of the drum along a screw line. The circumference of the drum corresponds to the diameter of the drum multiplied with the number $\pi$, i.e. to approximately 3-times of the diameter of the drum. When considering that the sludge or suspension supplied is only once transported around the circumference of the drum, it becomes obvious that the constructional length of the slot sieve, as measured in flow direction, is reduced to one third of the constructional dimension of an obliquely arranged slot-sieve. The suspension can, however, flow a plurality of times around the inner circumference of the drum, in which case the active length of the slot-sieve becomes a multiple, seen in flow direction.

For the purpose of drying brown coal, peat or other organic solid materials, the arrangement can preferably be such, that the sieve drum is arranged within a pressure-resistant and tightly closable housing and that a discharge opening and a charge opening for the material to be dewatered and particularly being designed as a lock is arranged on the housing. In this manner, the operation conditions within the sieve drum can correspond to the conditions required for a drying process according to Fleissner according to which the solid materials are dried under the action of an atmosphere of saturated steam at elevated temperatures. In view of the interior of the sieve drum being maintained under an elevated pressure of, for example, 8 to 45 bar, a correspondingly pressure-resistant and tightly closable housing is provided which can be charged and, respectively, discharged via a lock and which is correspondingly heat-insulated.

In view of the charged material being reliably transported by the conveying screw, the axis of the sieve drum can essentially horizontally be arranged. This provides for a simple bearing support of the drum. For subjecting the material to be dewatered to the action of saturated steam or superheated steam, steam supply openings can be arranged within the interior of the housing and outwardly of the sieve drum, said openings preferably being arranged along a generatrix of the drum mantle and preferably above the sieve drum. This arrangement simultaneously provides the possibility to clean the slotted sieves, by means of the steam supplied, from the outer side of the slot-sieve drum. Preferably, discharge openings for condensating water and/or water coming from the material to be dewatered are in this case arranged at the bottom of the housing for continuous removal of the water.

The rotational drive for the drum and for the screw is preferably dimensioned such that the rotating speed of the screw can be selected greater than or equal to the rotating speed of the sieve drum, thereby making sure that no centrifugal force is transmitted by the slot-sieve drum to the material to be dewatered. The use of a slot-sieve drum for drying organic solid materials such as, for example, brown coals within a steam atmosphere provides the additional advantage that the space being kept under an elevated pressure can be kept small. When drying sewage sludge it is, as a rule, required to reliably establish a size of flocks, which is favorable for the subsequent drying operation, still prior to the transfer onto the slot-sieve drum. According to a preferred embodiment of the invention, a cylindrical charging space rotating together with the drum and having a diameter exceeding the diameter of the charging opening and being delimited by an axially shiftable ring at its end located remote from the drum can precede the charging opening. By shifting this ring, being tightly guided within the cylindrical charging space, the length of this cylindrical charging space and thus its volumetric capacity can in a simple manner be changed. This is of advantage if a suspension, for example sewage water, shall be treated to which was added a flocculating agent for the solid materials. Within the charging space, the suspension having added thereto the flocculating agent shall be allowed to calm and the correct formation of flocks is dependent on the residence time within the charging space and thus on its volumetric capacity. In dependence on the available space of this charging space there result varying flock sizes and thus conditions being favorable for the following drying stage.

The slot-sieve drum can in a simple manner be designed as a cylinder. According to the invention, the drum can without difficulty, be designed as a truncated cone or, respectively, as a cone, the generatrices of the drum mantle being, if desired, straight or curved or, respectively, broken generatrices. The conveying screw can, in a simple manner, be adapted to the inner contour of the sieve drum. By selecting the type of the generatrices of the drum mantle, the dewatering behavior of the material to be dewatered can be taken in consideration.

In any case, the material to be dewatered is charged via a charging opening provided at one front end of the sieve drum. An embodiment of particularly simple construction results if a bearing for the conveying screw is arranged at the front end of the sieve drum located opposite to the charging opening, said first mentioned front end preferably being closed and the discharge opening within the housing being aligned with at least one opening within the mantle of the sieve drum. In this case, the slots of the sieve drum extend in essentially axial direction of the drum. In view of the rotation of the sieve drum, the material to be dewatered flows in transverse direction to these slots of the sieve drum having as a result a good dewatering effect with an only low wear of the sieve. Any wear of the slot sieve can substantially be reduced if the slots extend within the mantle of the sieve drum along helical lines and in an essentially parallel relation to the blade surfaces of the conveying screw. To be in the position to take in consideration varying throughput per unit of time, the arrangement is preferably such that the rotating speed of the drum can be adjusted independent from the rotating speed of the screw.

In the following, the invention is further illustrated with reference to an embodiment shown in the drawing in which FIG. 1 schematically shows the arrangement in such a device and FIG. 2 shows a section along the line II—II of FIG. 1.

In the drawing there is shown a device for drying organic solid materials such as, for example, water-containing brown coals by using steam. The discontinuous drying process according to Fleissner being performed by using saturated steam and by using large autoclaves has, on account of the constructional height of the autoclaves reaching up to 8 m, drawbacks with respect to the mechanical stress of the coal during filling and discharging manipulation and with respect to discharging the condensated water and the water expelled from the coal and the $CO_2$ formed during the carbonization process taking place. The condensating water and the water from the coal flowing through the coal bed under the action of gravity as well as the $CO_2$ becoming settled on account of its higher specific weight results in reduction of the heat transfer from the steam onto the coal. Furthermore, waste products such as the waste water and the $CO_2$ are unnecessarily heated whereby the amount of heat required for the drying process is increased. Furthermore, obstruction of the sieves arranged on the bottom of the autoclaves by coal fines can be observed which can retard or even obstruct removal of the waste water.

In the drying device according to the invention, there is provided a housing 1 and a rotatably supported slot-sieve drum 2. A conveying screw 3 is rotatably supported within this slot-sieve drum. Charging of the coal to be dewatered is effected via a coal lock 4 at one front end 5 of the sieve drum 2. A guide plate 6 is arranged at the charging end and serves the purpose that the coal is caught by the conveying screw 3 within the interior of the slot-sieve drum. The conveying screw 3 conveys the charged material from the front end 5 to the rear end 7 of the sieve drum 2 in an essentially axial direction of the sieve drum 2. The axis 8 of the sieve drum 2 as well as the conveying screw 3 extends in an essentially horizontal direction. The sieve drum 2 is bearingly supported within the housing 1 in bearings 9 and 10 and can be rotated via a drive shaft 11. The front end 7 of the drum located opposite the charging end is designed as a closed end wall 12 which carries a bearing 13 for the conveying screw 3. The conveying screw 3 is rotated via the shaft 14 in common with or separate from the sieve drum 2. The webs 15 delimiting the slots of the sieve drum extend, in the embodiment of FIG. 1, in axial direction of the drum. The charged material is transported to the radial opening 16 provided in the sieve drum 2 and being in alignment with the discharge opening 17 equally designed as a lock. On the bottom of the housing 1 there are arranged in axial direction of the drum discharge openings 18 for discharging the expelled water. A common collecting conduit 19 for waste water is passed through a sludge settling tank 20 and through an oxydator 21 and it is only then that the water is disposed of into a main drainage channel.

At the top cover side of the housing there are provided in axial direction of the drum 2 steam inlet openings 22 to which steam is supplied from a common steam conduit 23. The steam thus blown onto the mantle of the sieve drum 2 serves the purpose of maintaining an atmosphere of saturated steam within the housing 1 during drying operation and simultaneously provides the possibility to clean the sieve slots.

In FIG. 2 there is shown a cross section through the drum 2. The segments of the conveying screw 3 are designated 24. The webs 15 extending in axial direction of the drum are formed of annular or helical webs 25 extending in circumferential direction and at a corresponding distance one from the other for forming the slots 26.

The housing 1 will resist a pressure up to 45 bar. The brown coal being rich in water and preferably having a granulometry of 0 to 50 mm and having been preheated with hot water or, respectively, waste steam is supplied to the drying device equipped with a slot sieve drum via a pressure lock and is conveyed through the slot-sieve drum by means of the conveyor screw and is discharged at the other end of the slot-sieve drum. The residence time of the coal within the slot-sieve drum is dependent on the applied steam pressure, on the applied steam temperature and on the maximum lump size of the coal to be dried. With a pressure of 45 bar and, respectively, a temperature of 260° C. of the saturated steam the residence time as calculated for completely heating a coal lump of 50 mm diameter is approximately 30 minutes as a maximum. The throughput capacity of a drying device equipped with a slot-sieve drum is determined by the diameter of the slot-sieve drum, by the filling ratio and the transport speed of the coal. The filling ratio will, as a rule, amount to 10 to 35%, preferably 25%. The equally rotating slot-sieve drum allows the condensate water and the water expelled from the coal as well as the $CO_2$ formed to be immediately removed. The slot width of the slot-sieve made of stainless steel is between 0.2 and 1 mm and is preferably approximately 0.5 mm. For keeping free the slots of the slot sieve by continuously cleaning same, the steam required for the drying operation is supplied via nozzles onto the upper side of the slot-sieve drum, thus blowing the slots of the slot-sieve free of contaminations. Discharging of the coal from the drying device equipped with a slot-sieve drum is again effected by means of a lock. In principle, the heating medium and, respectively, drying medium can be hot water, saturated steam or superheated steam. According to the technical requirements just existing there is possible the combination of a plurality of drying devices equipped with a slot-sieve drum each, the combination of a stationary slot-sieve cascade with a drying device equipped with a slot-sieve drum as well as the combination with a drying centrifuge.

Furthermore the above mentioned continuously operated drying systems can be coupled with a coking plant or a gasification plant or a hydrogenating plant for technologically improving the process operation and, respectively, for utilizing the waste heat of the upgrading processes following the drying process for the purpose of steam production.

The rotating speed of the drum is selected between 0.1 and 10 $min^{-1}$ for reliably preventing a centrifugal action of the drum. The rotating speed of the conveying screw 3 can be selected higher in correspondence with the throughput. Beside providing the sieve-drum 2 with slots extending along helical lines and obliquely relative to the generatrices for reducing the wear of the sieve drum, it is, according to the invention, also possible to rotate the conveying screw 3 in opposite direction to the direction of rotation of the drum 2.

What is claimed is:

1. Device for drying of solid materials such as, for example, brown coals containing water, sewage sludges, pulps or the like as well as for leaching organic or inorganic materials, comprising a rotatably supported slot sieve drum horizontally arranged within a tightly closeable and pressure resistant housing having means defining a charging opening and means defining a discharging opening for the material to be dried arranged on the housing as a lock, the interior of the housing having means defining a plurality of steam supply openings, the sieve drum having slots within its side wall extending from the inlet end to the outlet end, and a conveying screw located within the housing and coaxially arranged relative to the drum, the conveying screw and the drum arranged for being rotated around their axes such that solid materials in said drum are not subjected to centrifugal force.

2. Device as claimed in claim 1, characterized in that the steam supply openings are arranged along a generatrix of the drum side wall and are preferably opening above the sieve drum.

3. Device as claimed in claim 1, characterized in that drain openings for condensating water and/or water emerging from the material to be dewatered are arranged at the bottom edge of the housing.

4. Device as claimed in claim 1, characterized in that the charging opening for the material to be dewatered opens at the front end of the sieve drum.

5. Device as claimed in claim 1, characterized in that a bearing for the conveying screw is arranged at the outlet end of the sieve drum, said outlet end being preferably a closed end and said discharge opening within the housing being in alignment with at least one radial discharge opening in the drum side wall.

6. Device as claimed in claim 1, characterized in that the slots of the sieve drum extend substantially in axial direction of the drum.

7. Drum-type apparatus for separating liquid from solid materials by gravity and without the application thereto of centrifugal force comprising: a generally horizontal sieve drum having means defining a solids inlet at one end and means defining a solids outlet at the other end and a side wall provided with slots along the length thereof between said ends; a tightly-closable, pressure-resistant housing having at least one means defining a liquid outlet in the bottom thereof and means defining a solids inlet and a solids outlet in communication, respectively, with said inlet and outlet ends of said drum, said housing having first and second end walls and a side wall surrounding said drum, with an annular space between said drum and said housing; bearing means within said housing supporting said drum for rotation about its axis; a rotatable conveying screw within said drum, said screw including a drive shaft having an end portion extending through the first end wall of said housing and an opposite end portion rotatably supported in a bearing carried by said drum; a drum drive shaft connected to said drum and extending through the second end wall of said housing for rotating said drum at a speed below that at which centrifugal force is transmitted to materials in said drum; and a plurality of steam nozzles arranged along the upper surface of said housing for introducing steam into said annular space and into the slots in said drum for cleaning said slots.

* * * * *